Nov. 25, 1947.   C. W. EARP ET AL   2,431,317
INDICATING SYSTEM FOR RADIO BLIND LANDING SYSTEMS
Filed June 22, 1943   2 Sheets-Sheet 1
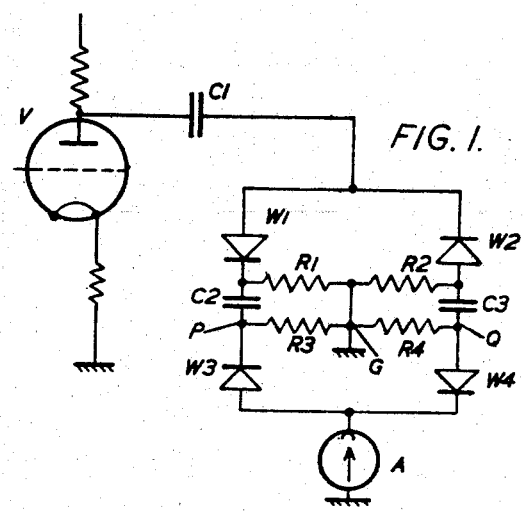
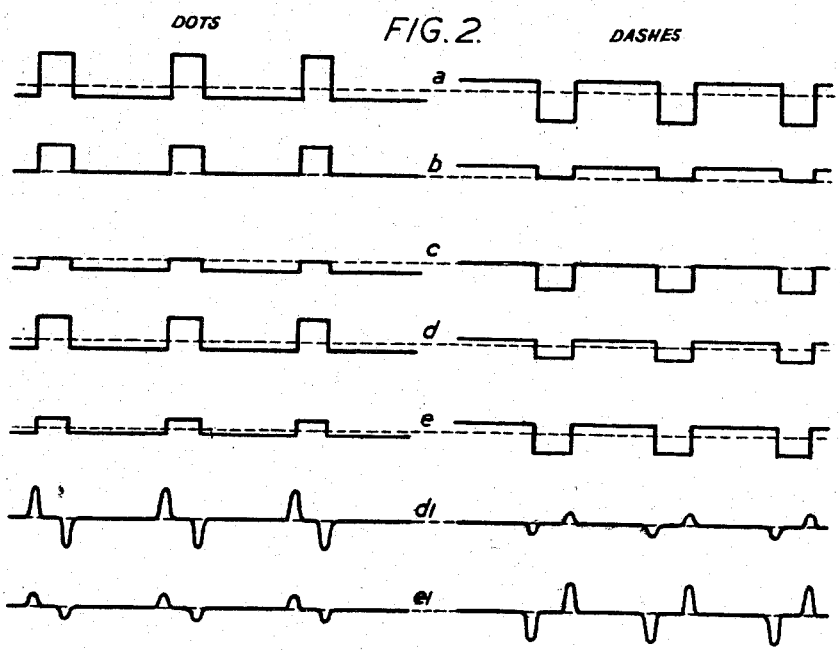

Patented Nov. 25, 1947

2,431,317

UNITED STATES PATENT OFFICE 2,431,317

INDICATING SYSTEM FOR RADIO BLIND LANDING SYSTEMS

Charles William Earp and Jeffrey Dennis Weston, London, England, assignors, by mesne assignments, to International Standard Electric Corporation, New York, N. Y., a corporation of Delaware Application June 22, 1943, Serial No. 491,754
In Great Britain July 28, 1942

4 Claims. (Cl. 177—352)

This invention relates to arrangements for distinguishing between a "dot" signal and its conjugate "dash" signal and particularly though not specifically for indicating deviations of a mobile receiver, for example, carried by an areoplane or ship, from a navigational track defined by the intersection of two overlapping beams of radiation modulated by complementary signals, so that on the track a continuous dash or no signal is obtained in the receiver.

According to one aspect of the invention in arrangements for distinguishing between a "dot" signal and its conjugate "dash" signal the received alternating signal is applied to a circuit having two paths in parallel such that in one path a direct current is developed which varies according to the positive peak voltage of the alternating signal, whilst in the other path a current is developed which similarly corresponds to the negative peak voltage these currents being passed differentially through a direct current instrument or the corresponding voltages being applied to a differential voltmeter.

According to another aspect of the invention arrangements for indicating deviations of a mobile receiver from a navigational track defined by the intersection of two overlapping beams of radiation modulated by complementary signals so that on the track a continuous dash or no signal is obtained in the receiver is characterised in this, that the received signals are applied to two paths, one responsive to positive voltages or currents, and the other responsive to negative voltages or currents, the outputs of said two paths being applied differentially to a direct-current meter.

Figure 3:
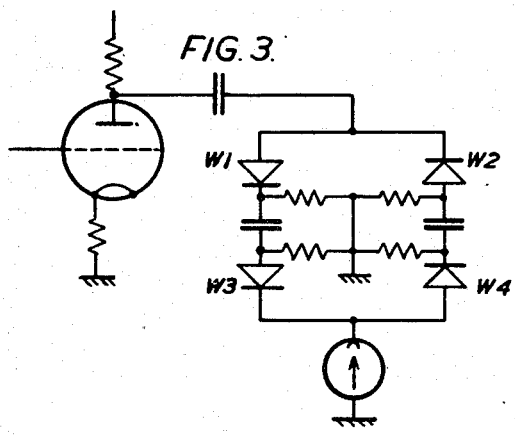
Figure 4:
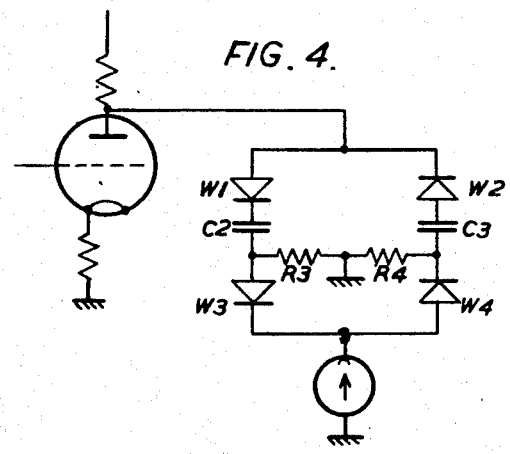

The invention will be better understood from the following description, taken in conjunction with the accompanying drawings, in which Figure 1 is typical circuit arrangement, and Figure 2 shows explanatory curves and Figures 3 and 4 show modifications of the arrangements shown in Figure 1.

A voltage having a waveform corresponding to either "dots" or "dashes" is obtained as is now well known by demodulation in a receiver of which the last valve V only is shown in Figure 1. The output from V has its direct-current component removed by a condenser $C_1$, so that the resulting signal has a form resembling that of curve ($a$) Fig. 2. This signal is applied to two similar half-wave rectifier circuits, $W_1$, $R_1$ and $W_2$, $R_2$, connected so that one rectifier conducts when the applied voltage is positive and the other when it is negative. Accordingly, the voltages across the load resistors $R_1$ and $R_2$ will have the forms shown by curves $b$ and $c$, Fig. 2, respectively.

The steady components of these waves are removed by the two similar high pass filters, $C_2$, $R_3$ and $C^3$, and $R^4$, yielding across $R_3$ and $R_4$ voltages having the forms shown by curves $d$ and $e$ respectively. It will be seen that whilst these voltages across $R_3$, $R_4$ are two alternating quantities of similar wave form, the amplitude of ($d$) is greater than that of ($e$).

It may be noted here that the high pass filters $C_2$, $R_3$ and $C_3$, $R_4$ may have any form providing that they remove the direct current component. For example, ideally $R_3$ and $R_4$ would take the form of pure inductances, but it may be more economical to use resistances as shown. Further, the condensers $C_2 C_3$ may be of any value, for example, they may be too small to pass the dot or dash envelopes in undistorted form as shown in Figs. 2$d$ and 2$e$, but may produce the alternative waveforms $d'$ and $e'$.

The differentially connected rectifiers $W_3$ and $W_4$ produce a direct current, which flows through the instrument A and depends in magnitude and direction on the difference between ($d$) and ($e$), or ($d'$) and ($e'$). In this latter case only one pulse of a pair of pulses is passed by $W_3$ or $W_4$. If this difference is regarded as positive when dot signals are received, it will be negative when dash signals are received, since the two types of signal, after removal of the direct-current component, differ only in sign, as will be seen from Figure 2. Thus, if the instrument A is a centrezero direct-current milliammeter, it will give a deflection to one side or the other according to the sense of the deviation of the receiver from the defined track. Moreover, when a continuous dash or steady signal is received on the track, no deflection can occur since the rectifier system is not energised in any way.

It is clear that the arrangements described depend in principle upon the fact that, for a dot signal, with direct-current removed, the positive peak voltage is greater than the negative peak, whilst the reverse is true for the dash signal.

For a perfect rectangular waveform, if the ratio of dash duration to dot duration is $x$, then the ratio of the peak voltages obtained in the receiver is $\pm x$.

Referring to Fig. 1, it may be noticed that the function of $W_3$ and $W_4$ is to rectify alternating current waves, and that both may be reversed in direction of conductivity as shown in Fig. 3.

Referring again to Fig. 1, if the rectifiers $W_1$ and $W_2$ are not perfect valves, that is, if they have appreciable backward conductance, their load resistances, $R_1$ and $R_2$, may be removed. In this case the condenser $C_1$ becomes redundant and may also be omitted.

In this case, the original circuit of Fig. 1 develops into the circuit of Fig. 4. When using the "simplified" circuit of Fig. 4, it is desirable to connect the rectifiers with directions of conductivity as shown in Fig. 4, as otherwise, with $W_3$ and $W_4$ reversed, if they are non-linear in characteristic, these rectifiers tend to produce a differential current independent of the action of $W_1$ and $W_2$, but in opposite sense from that which $W_1$, $W_2$ encourage.

What is claimed is:

1. In a course indicating system, a circuit for comparing the relative amplitudes of demodulated complementary signals comprising two parallel paths connected between one point and another point in the circuit, each of said two paths having respectively an asymmetric conducting element connected between said one point and a first junction, said two asymmetric elements being oppositely poled, a condenser connected between said first junction and a second junction, a direct current conducting circuit element normally providing a substantial potential drop connected between said second junction and said other point, a pair of series connected asymmetric conducting elements connected across said two branches at said second junctions, and a direct current meter connected between said other point and the common asymmetric conducting terminal of said last-named two asymmetric conductors.

2. The system of claim 1 wherein the asymmetric conducting elements in each parallel path are oppositely poled and wherein said asymmetric conducting elements have sufficient reverse conductivity to prevent condenser blocking.

3. The system of claim 1 wherein a load resistor is connected between said other point and the first junction in each path.

4. The system of claim 1 wherein said asymmetric conducting elements are poled in series around the two parallel paths as a branch circuit.

CHARLES WILLIAM EARP.
JEFFREY DENNIS WESTON.

REFERENCES CITED

The following references are of record in the file of this patent:

UNITED STATES PATENTS

| Number | Name | Date |
|---|---|---|
| 2,241,915 | Kramar | May 13, 1941 |
| 2,275,298 | Hugenholtz | Mar. 3, 1942 |
| 2,300,593 | Perroux | Nov. 3, 1942 |
| 2,271,534 | Bailey | Feb. 3, 1942 |

FOREIGN PATENTS

| Number | Country | Date |
|---|---|---|
| 441,370 | Great Britain | Jan. 17, 1936 |
| 526,114 | Great Britain | Sept. 11, 1940 |
| 809,447 | France | Dec. 12, 1936 |